United States Patent [19]

Hendrickson et al.

[11] 4,032,934

[45] June 28, 1977

[54] AUTOMATIC FOCUSING SYSTEM

[76] Inventors: Kenneth L. Hendrickson, 7301 N. Ridge Blvd., Chicago, Ill. 60645; Robert F. Johnston, 1112 Valley Drive, Wildwood, Ill. 60030

[22] Filed: Dec. 26, 1974

[21] Appl. No.: 536,666

[52] U.S. Cl. .............................. 354/25; 250/204; 352/140; 354/165
[51] Int. Cl.² ........................................ G03B 3/10
[58] Field of Search ........... 354/162, 163, 166, 25, 354/165; 353/101; 352/140; 356/4; 250/201, 204

[56] References Cited

UNITED STATES PATENTS

| | | | |
|---|---|---|---|
| 3,435,744 | 4/1969 | Stimson | 354/25 |
| 3,639,048 | 2/1972 | Heaney et al. | 353/101 |
| 3,652,160 | 10/1969 | Odore et al. | 354/163 X |
| 3,815,994 | 6/1974 | Peckham | 356/4 |
| 3,820,129 | 6/1974 | Hosoe et al. | 354/25 |
| 3,896,304 | 7/1975 | Aoki | 354/25 X |
| 3,906,389 | 9/1975 | Matsumoto et al. | 250/201 |

*Primary Examiner*—Edna M. O'Connor
*Attorney, Agent, or Firm*—James B. Blanchard; Jerold A. Jacover

[57] ABSTRACT

This invention relates to photographic apparatus having means for automatically moving a lens along an axis for properly focusing on an object. The apparatus includes a light emitter for transmitting a train of light signals toward the object at a constant angle relative to the axis, and a pair of movable photoreceptors disposed in spaced relationship with the emitter in the apparatus. The photoreceptors are adapted to receive the light signals upon reflection thereof from the object, and are further adapted to produce electrical signals corresponding to the amount of light received. An operational amplifier is adapted to receive the electrical signals produced by the photoreceptors, and produce a difference signal corresponding to the difference in strength of the electrical signals. The apparatus further includes an electric motor, responsive to the difference signal, adapted to cause the movement of the lens along the axis, and further adapted to cause the movement of the photoreceptors until the amount of light received at each of the photoreceptors is equalized to produce an absolute minimal difference signal indicative of the object being properly focused by the lens. A gain change device is provided to increase the amplitude of the difference signal when relatively far objects are focused on.

7 Claims, 6 Drawing Figures

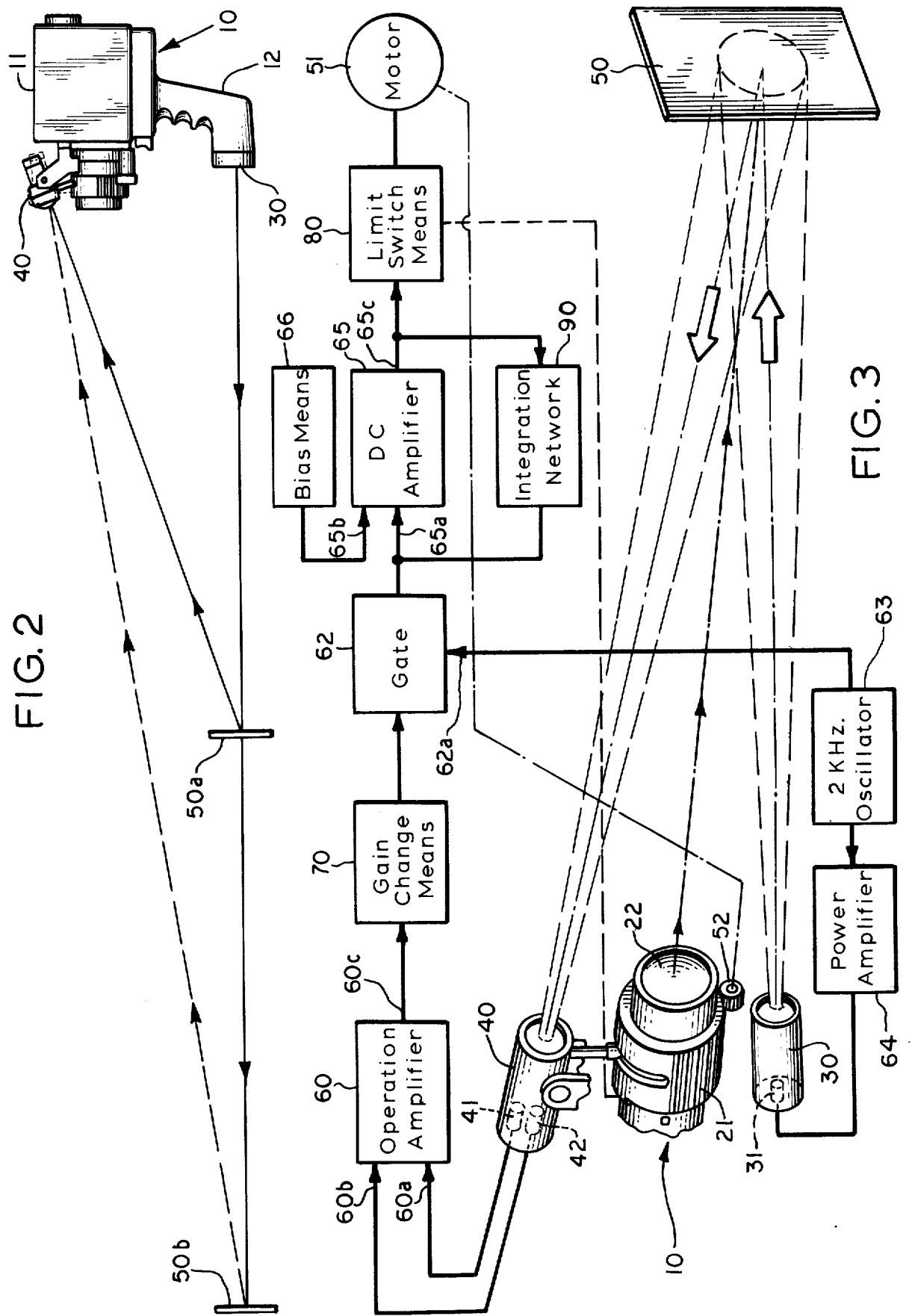

AUTOMATIC FOCUSING SYSTEM

BACKGROUND OF THE INVENTION

This invention relates to photographic apparatus such as cameras, and in particular, to a system for automatically focusing an object to be photographed.

It is well known that cameras often include optical means, such as an objective lens, which are movable along a longitudinal axis for the purpose of focusing an object onto a light sensitive surface disposed inside the camera. Focusing is generally accomplished by manual means, such as by rotating or axially shifting a lens encompassing sleeve. The adjustment of the sleeve conventionally imparts linear motion to the lens along the longitudinal axis in a manner well known in the art. Recently, however, means have been employed for automatically focusing the lens on the object to be photographed, thereby eliminating the need to manually adjust the lens-encompassing sleeve. Such automatic focusing systems are highly desirable since they reduce the chance of human error associated with conventional focusing techniques.

Automatic focusing systems of the prior art vary. One such system uses triangulation methods for determining the distance between the object and the lens. The system comprises means for sweeping a collimated light beam across a plane until it strikes the object to be photographed. Light reflected from the object, is then passed to means for producing electrical information corresponding to the angle at which the reflected light is received. The electrical information is used to effect adjustment of the lens until the selected object is properly focused. Once the lens is so adjusted, cam means are employed to prevent the collimated light beam from sweeping past the object, thereby fixedly establishing the position of the lens. As a result, further focusing cannot be effected until the cam means are released, such as by actuating a shutter mechanism.

Such automatic focusing systems of the prior art are not without salient drawbacks and deficiencies. For example, the cam means in the system described generally preclude further automatic lens adjustment once a selected object has been focused. This can cause obvious prlblems if a photographer decides to photograph a different object instead of the one originally selected. Without the cam means, however, the continuously sweeping light beam will scan past the selected object, thereby preventing the object from being automatically focused. Moreover, such systems are not readily adapted for use in motion picture cameras, where planning or action shots may require continuous focusing on an object which is at varying distances from the lens during the time interval it is photographed. It is thus a primary object of this invention to provide an automatic focusing system which overcomes these and other drawbacks in the prior art.

SUMMARY OF THE INVENTION

The primary object of the invention is achieved in a photographic apparatus having means for automatically moving a lens along an axis for properly focusing an object. More particularly, the apparatus comprises emission means producing a train of light signals toward the object at a constant angle relative to the axis. A pair of movable photoreceptor means are disposed in the apparatus in spaced relationship with the emission means and are adapted to receive the light signals reflected from the object. The photoreceptor means are further adapted to produce electrical signals corresponding to the angle of the light rays received. The apparatus also includes signal translation means, adapted to receive the electrical signals produced by the photoreceptor means, and produce a difference signal corresponding to the difference in the strength of the electrical signals. Mechanical means, responsive to the difference signal, are adapted to cause the movement of the lens along the axis, and are further adapted to cause the movement of the photoreceptor means until the amount of the light received at each of the photoreceptor means is equalized. When the amount of the light received at each of the photoreceptor means is equalized, the difference signal is reduced to a minimal value indicative of the object being properly focused by the lens.

Such a minimal difference signal will effect a minimal response from the mechanical means, thereby maintaining the lens in position to keep the object in focus. If, however, an object at a different camera-to-object distance is desired to be focused on, or there is relative movement between the object and the camera, the difference signal will change accordingly. This, in turn, causes the mechanical means to automatically adjust the lens until proper focusing is again achieved.

BRIEF DESCRIPTION OF THE DRAWINGS

An exemplary embodiment of the invention summarized above is illustrated in the accompanying drawings in which:

FIG. 2 is a reduced view of the photographic apparatus shown in FIG. 1, illustrating schematically the path followed by a train of light signals passed to, and reflected from, a near and a far object;

FIG. 3 is a diagram partially in schematic form for illustrating a portion of the photographic apparatus shown in FIG. 1, a partially in block form for representing electrical circuitry incorporating the invention.

DETAILED DESCRIPTION OF AN EXEMPLARY EMBODIMENT

Before describing the optical apparatus with particularity, a general explanation of the operation of the exemplary embodiment would be helpful. In brief, an optical instrument such as a camera is provided with means for producing a train of light signals emanating from the instrument. The train of light signals does not sweep through a predetermined arc, but is passed at a constant angle relative to a longitudinal axis along which a focusing lens is movable.

The light signals, which are pulsed at a selected high frequency rate, will thus impinge an object to be photographed when the focusing lens is pointed in that general direction. Light signals reflected from the object are received at a pair of photoreceptors disposed proximate one another on the camera in spaced relationship with the emitter. Each of the photoreceptors produce electrical signals, corresponding to the amount of the reflected light impinging thereon. The electrical signals are then passed to signal translation means, which produce a difference signal corresponding to the difference in strength between the electrical signals produced by the photoreceptors.

The difference signal is passed through electrical circuitry to mechanical means including an electric motor. The electric motor is linked to a sleeve, encompassing the focusing lens, and upon energization by the difference signal, moves the lens along the longitudinal axis toward a position which would bring the object into proper focus. In this exemplary embodiment, means housing the photoreceptors are mechanically linked to the sleeve, whereby movement of the sleeve causes movement of the photoreceptors in a manner which tends to equalize the amount of the reflected light striking the photoreceptors. This results in an absolutely minimal difference signal which effects a minimal response from the motor. Accordingly, the lens is maintained in positions along the longitudinal axis to keep the selected object in focus.

Figure 1:
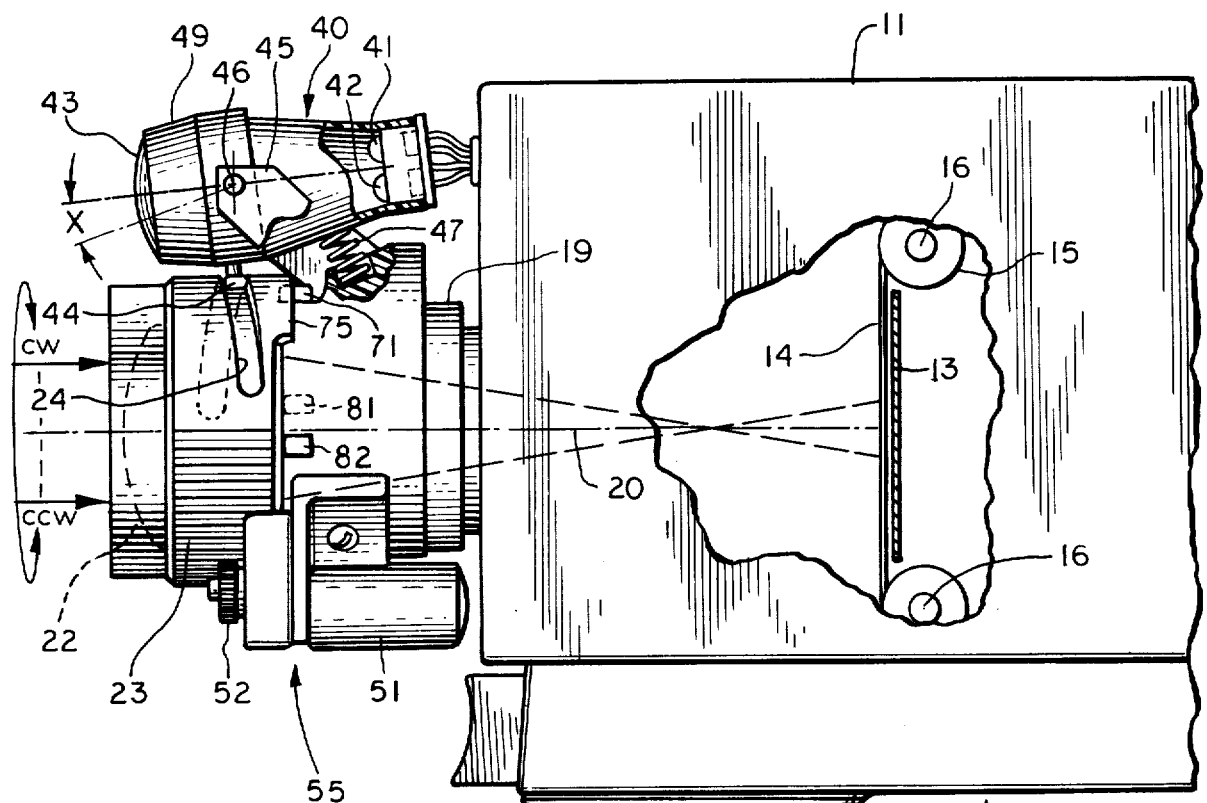
FIG. 1 is a side view, partially cut away, of a photographic apparatus incorporating the invention.

Referring now to the drawings, and in particular to FIG. 1, a photographic apparatus such as a camera is represented generally by reference numeral 10. Camera 10 comprises a lightproof enclosure 11, housing stationary means, such as a plate 13, and guide pins 16, for aligning light sensitive media such as a film 14 with an objective lens 22, shown best in FIG. 3. Film 14 may be carried out by any suitable means 15, such as a reel, cartridge or cassette. In the exemplary embodiment, guide pins 16 also serve means 15 inside lightproof enclosure 11, and facilitate the movement of the film past plate 13.

Camera 10 further comprises an annular barrel 19, supporting objective lens 22. Cooperating with barrel 19, is a rotatable sleeve 21, having teeth 23 disposed about the periphery thereof. Also disposed in the peripheral surface of sleeve 22 is a cam-following track 24, whose function is explained hereinafter. Sleeve 21 is rigidly joined to lens 22 in a well-known manner so that, upon rotation of sleeve 21, both sleeve 21 and lens 22 move along a longitudinal axis 20. Axis 20 is conventionally aligned with plate 13, film 13, a shutter (not shown) and lens 22. Thus, for example, the counterclockwise rotation of sleeve 21 may advance lens 22 along axis 20 toward plate 13, and the clockwise rotation of sleeve 21 may move lens 22 in the opposite direction. The clockwise (cw) and counterclockwise (ccw) directions are determined by looking through the objective lens toward the object and are indicated by the appropriate arrowheads shown in FIG. 2.

Secured to enclosure 11 of camera 10 is a handle 12 having a forwardly projecting member 17. Disposed inside handle 12, and in particular, disposed inside member 17 are emission means designated by reference numeral 30. In this embodiment, emission means 30 include a light emitting diode 31 adapted to produce a train of light signals in a manner explained in greater detail hereinafter. A mirror 32, disposed inside handle 12, is adapted to receive the train of light signals from diode 31 and reflect it through projecting member 17 to optical means 33. Optical means 33 direct the train of light signals from mirror 32 outside camera 10 along an axis 34 which is preferably parallel to longitudinal axis 20. The train of light signals is thus emitted from means 30 at a constant angle relative to longitudinal axis 20, preferably in parallel with axis 20.

When lens 22 of camera 10 is directed toward an object to be photographed, the train of light pulses from emission means 30 will impinge upon, and then be reflected from that object. A portion of these reflected light signals will be received at reception means 40 mounted on camera 10. In this exemplary embodiment, reception means 40 include first and second photoreceptors 41 and 42 disposed in spaced relationship inside a housing 49. Photoreceptors 41 and 42 are preferably pin photo diodes which conventionally produce an electrical signal corresponding to the amount of the light impinging thereon. To insure that light reflected from the object is always passed to at least one of photoreceptors 41, 42, a collecting lens 43 is secured at the forward end of housing 49.

In this exemplary embodiment, housing 49 is mounted on camera 10 by a rigid support 45. More particularly, support 45 is fixedly attached to the camera body, and secured through pivot means 46 to housing 49. A coiled spring 47 applies a force against housing 49 to urge the forward portion of reception means 40, including lens 43, down toward sleeve 21. Opposing the force of spring 47 is a cam 44, extending downwardly from housing 49 and adapted to engage cam-following track 24 in sleeve 21.

As shown in FIG. 1, cam-following track 24 is characterized by a slight pitch at it curves about the periphery of sleeve 21. Thus, when sleeve 21 is rotated to effect focusing of an object by lens 22, housing 49 pivots about means 46 through an angle X. As a result, depending on the direction in which sleeve 21 is rotated, lens 43 of housing 49 is either moved closer to or further from sleeve 21. The pivoting cabability of reception means 40 enables photoreceptors 41, 42 to receive reflected light from either near or far objects designed at 50a and 50b, respectively in FIG. 2. In this exemplary embodiment, automatic focusing by camera 10 is limited to objects no nearer than five feet and no farther than twenty-five feet, through objects exceeding these limits may be manually focused by rotating sleeve 21 by hand.

The reflected light received by reception means 40 causes electrical signals to be produced by photoreceptors 41 and 42. As explained hereinafter, circuitry shown by block form in FIG. 3 responds to these signals by producing a difference signal which is adapted to energize mechanical means 55, including an electric motor 51. Upon energization, motor 51 turns a circular gear 52 which cooperates with teeth 23 to automatically rotate sleeve 21. The rotation of sleeve 21 is used to effect movement of lens 22 for bringing an object to be photographed into focus.

Disposed on barrel 19, and cooperating with sleeve 21, is a gain change switch 71 and a pair of normally closed limit switches 81 and 82. Gain change switch 71 is opened when lens 22 is moved into position for focusing relatively near objects. However, as sleeve 21 is rotated to effect movement of lens 22 along axis 20 toward film 14, a threshold point is crossed at which a tab 75 on sleeve 21 causes gain change switch 71 to close. Closure of gain change switch 71 can thus occur at any predetermined position of lens 22, though it is preferred that this threshold point correspond to the place along axis 20 where lens 22 is positioned for properly focusing objects at a distance of ten feet.

The excessive rotation of sleeve 21 further causes tab 75 to open limit switches 81 and 82. Thus, if sleeve 21 is rotated to effect movement of lens 22 for focusing objects nearer than five feet, tab 75 will cause limit switch 81 to open. Similarly, if sleeve 21 is rotated to effect movement of lens 22 for focusing objects further than twenty-five feet, tab 75 will cause limit switch 82 to open. As explained in greater detail hereinafter, gain change switch 71 serves to increase the amplification or gain of a difference signal when relatively far objects are focused, and limit switches 81, 82 serve to deenergize motor 41 when the automatic focusing limits of camera 10 are exceeded.

Camera 10 is constructed so that the object to be photographed is properly focused when the amount of the light striking photoreceptors 41 and 42 is equal. Under these circumstances, the electrical signals produced by photoreceptors 41 and 52 will also be equal and, as a result, an absolute minimal difference signal will be produced, thereby effecting a minimal response from motor 51. Accordingly, sleeve 21 and hence lens 22 will be maintained in place and the object will remain in focus.

If, however, lens 22 is improperly adjusted, the amount, of the reflected light striking one of the photoreceptors will exceed that of the other. For example, if lens 22 is adjusted for a relatively near object, and the object to be focused is relatively far, more reflected light may strike photoreceptor 42 than photoreceptor 41. Accordingly, a difference signal having a first polarity will be developed causing the energization of motor 51. Upon energization, motor 51 will rotate sleeve 21 counterclockwise, thereby moving lens 22 toward stationary plate 13 and film 14 to bring the far object into focus. The counterclockwise rotation of sleeve 21, however, will simultaneously cause reception means 40 to pivot so that lens 43 moves upwardly, away from sleeve 21. This shift in position of lens 43 tends to equalize the amount of reflected light striking photoreceptors 41, 42. As a result, an absolutely minimal difference signal is produce which allows sleeve 21 and lens 22 to be maintained in proper position for focusing the far object.

Of course, if lens 22 was originally adjusted for a relatively far object, when a near object was to be photographed, more reflected light will strike photoreceptor 41 than photoreceptor 42. This produces a difference signal of opposite polarity which causes mirror 51 to rotate sleeve 21 in a counterclockwise direction. Accordingly, lens 22 will be moved away from plate 13 and film 14, thereby bringing the near object into focus automatically.

The circuitry for accomplishing the automatic focusing described above is shown in block form in FIG. 3. More particularly, an oscillator 63 is used for generating a high frequency pulse train, typically 2Khz. The pulse train is amplified by a power amplifier 64 and passed to a light emitting diode 31 of emission means 30. The passage of the 2Khz pulses through diode 31 generates a train of light signals which are emitted from means 30 at the same rate. Since these light pulses are in the infrared position of the electromagnetic spectrum, they will not expose the film in camera 10 when the film which is generally not sensitive to infrared radiation, is being exposed to visible light.

As explained hereinbefore, the train of light signals from emission means 30 are reflected from an object 50, and then received at photoreceptors 41, 42 of reception means 40. Electrical signals, corresponding in strength to the amount of the light striking photoreceptors 41 and 42 are then passed to an operational amplifier 60 at a positive terminal 60a and a negative terminal 60b, respectively. Operational amplifier 60 preferably includes AC means, such as capacitors (not shown), for blocking spurious DC signals which may interfere with the operation of the automatic focusing circuitry. Such DC signals may be produced at reception means 40 as a result of an ambient light source such as sunshine or artificial illumination, striking photoreceptors 41, 42.

Operational amplifier 60 produces a difference signal at output terminal 60c. If the electrical signal at positive terminal 60a is stronger than that at negative terminal 60b, the difference signal at terminal 60c will have a positive phase. On the other hand, if the electrical signal at negative terminal 60b is stronger than that at 60a, the difference signal at terminal 60c will have a negative phase. If the electrical signals passed to terminals 60a and 60b are of subtantially equal strength, the difference signal at output terminal 60c will have an absolutely minimal value, typically zero.

Figure 4:
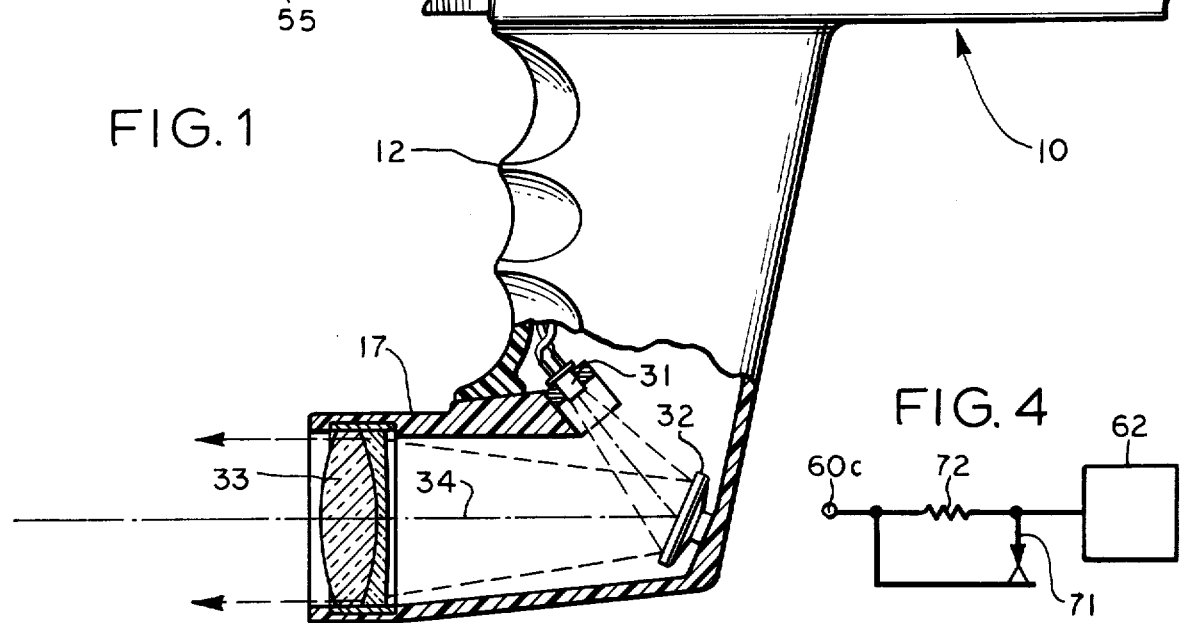
FIGS. 4–6 are circuit diagrams of portions of the photographic apparatus shown in block form in FIG. 3.

The difference signal at output terminal 60c is preferably passed to gain change means 70 shown best in FIG. 4. It is the purpose of gain change means 70 to increase the amplitude of the difference signal only when relatively far objects of the difference signal tends to be very weak when such distant objects are focused.

Gain change means 70 include a gain change switch 71 engageable with a contact 72 which is coupled to output terminal 60c of operational amplifier 60. Also connected to output terminal 60c is a resistor 73, which is coupled to a gate 62 and is shunted by the switch 71. As explained hereinbefore, when an object less than 10 feet from the camera is properly focused, switch 71 is open and therefore not engaged with contact 72. The difference signal at output terminal 60c is thus passed through resistor 73 to gate 62. When an object farther than ten feet from the camera is focused, however, tab 75 of sleeve 21 (FIG. 1) causes switch 71 to engage contact 72. Accordingly, the difference signal from output terminal 60c passes to gate 62 via the contacts on switch 71. Because, it bypasses resistor 73 only when relatively far objects are focused, the amplitude of the difference signal is desirably increased for far objects.

Returning again to FIG. 3, the difference signal produced at operational amplifier 60 is passed through gain change means 70 to gate 62. Gate 62 has a gating terminal 62a at which the 2Khz signal from oscillator 62 is received. In a manner well known in the art, the 2Khz signal permits the difference signal to be pushed through gate 62 at a 2Khz rate. As a result, all spuriously derived signals are blocked by gate 62, thereby limiting passage therethrough to the difference signal passed from gain change means 70.

As shown in FIG. 3, the difference signal is coupled from gate 62 to an input terminal 65a of a DC amplifier 65. Upon amplification, the difference signal ordinarily is passed from an amplifier output terminal 65c through limit switch means 80, to electric motor 51. If, for any reason, however, the difference signal applied to input terminal 65a is absent, a bias signal from bias means 66 will be applied to a bias terminal 65b of DC amplifier 65. Since the absence of a difference signal will ordinarily occur in situations where an extremely far object is focused, the bias signal will be of such strength and polarity as to cause motor 51 to move lens 22 in position for focusing far objects, typically those at a distance of 25 feet.

Figure 5:
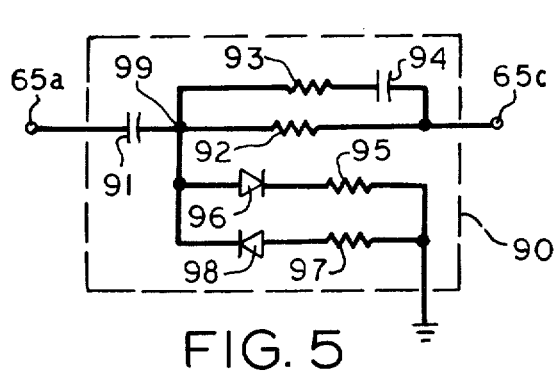

The output of DC amplifier 65 is also fed back through a nonlinear smoothing and stabilization network 90 to input terminal 65a. Network 90 is shown in greater detail in FIG. 5 and includes an RC path, comprising a resistor 92 and a serially connected compactor 91, coupled between terminals 65a and 65c. Connected in parallel with resistor 92 is a serial combination of a resistor 93 and a capacitor 94. Network 90 further includes the parallel combination of a first oriented diode 96 in series with a resistor 95, and a oppositely oriented diode 98 in series with a resistor 97. This parallel combination is coupled between a node 99 and a point of low potential commonly referred to as ground.

Nonlinear smoothing and stabilization network 90 integrates the difference signal appearing at output terminal 65c to smooth and stabilize the signal ultimately passed through limit switch means 80 to electric motor 51. The values of the circuit elements comprising network 90 which provide the best results are: resistors 92, 93 — 2000K and 15K, respectively; capacitors 91, 94 — 0.1f and 0.005f, respectively.

Figure 6:
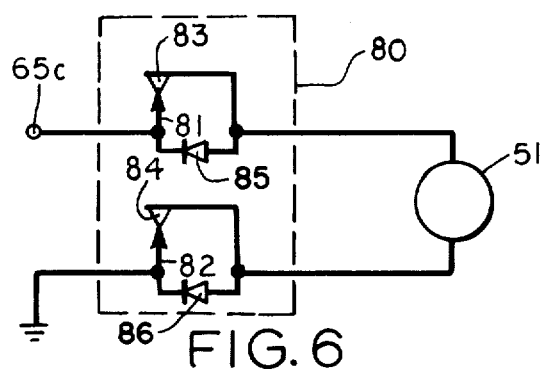

Referring now to FIG. 6, the operation of limit switch means 80 are shown. Limit switch means 80 include a first switch 81 connected between open terminal 65c through a diode 85 to electric motor 51, and a grounded second switch 82 connected through a diode 86 to electric motor 51. Switch 81 normally engages a contact 83 which is coupled through electric motor 51 to a second contact 84. Contact 84 is normally engaged with switch 82. Normally closed limit switches 81 and 82 thus permit electric motor 51 to be energized by the amplified difference signal appearing at output terminal 65c. However, as explained hereinbefore, when lens 22 is moved in a position to focus an object less than 5 feet or greater than 25 feet, either limit switch 81 or 82 opens, thereby de-energizing motor 51. Accordingly, limit switch means 80 prevent camera 10 from automatically focusing objects outside the established near and far limits. Of course, such objects may be manually focused by rotating sleeve 21 by hand.

The diodes 85, 86 in limit switch means 80 keep the system active then either switch 81 or switch 82 is open. More particularly, when a large positive voltage is present at terminal 65c, indicating that an object is at a distance greater than 25 feet, motor 51 drives lens 22 to its far limit, whereupon switch 81 opens. Diode 85 is thus reversed biased and power to motor 51 is removed. If the object subsequently moves into range, however, the polarity at terminal 65c decreases, whereby diode 85 conducts and motor 51 is re-energized. Motor 51 then causes sleeve 21 to reclose switch 81 to activate the system once again. The action of switch 82 and its associated diode 86 is similar except, of course, that the voltage polarity is reversed.

As illustrated in FIG. 3, when motor 51 is energized, circular gear 52 is turned, thereby automatically rotating sleeve 21. Rotation of sleeve 21 causes lens 22 to move toward a position which brings object 50 into focus. The rotation of sleeve 21 also causes reception means 40 to pivot relative to sleeve 21, thereby equalizing the light reflected onto photoreceptors 41, 42. When this light is equalized, the electrical signals passed to terminals 60a and 60b are also equal, causing an absolutely minimal difference signal to be produced at output terminal 60c of operational amplifier 60. Being of such minimal strength, the difference signal is insufficient to energize motor 51. Accordingly, sleeve 21, and hence lens 22 remain in position corresponding to the proper focusing of object 50.

If, however, camera 10 is subsequently directed at a more distant, object, the light signals emitted by emission means 30, are reflected from the object, will strike photo-receptors 41, 42 with different amounts of light. As a result, electrical signals of varying strengths will be passed to input terminals 60a, 60b, causing a non-minimal difference signal to be produced. Upon amplification, smoothing and stabilization, this difference signal will energize motor 51, causing lens 22 to be moved until the distant light is properly focused.

Should the object be at a distance greater than 10 feet, lens 22 will pass a threshold point, already explained, thereby actuating gain change means 70 to increase the amplitude of the difference signal. In the event the difference signal is absent, due to the diminished intensity of the reflected light striking photoreceptors 41, 42, bias means 66 will pass a bias signal to DC amplifier 65. As a result, lens 22 will be adjusted for focusing on a relatively distant object. Of course, if the object is too far distant, limit switch means 80 will be actuated, thereby de-energizing motor 51.

In view of the foregoing, it is clear that the exemplary embodiment herein disclosed permits accurate, automatic focusing of objects within a relatively wide range. Though this exemplary embodiment is preferred, it is also clear that many modifications and refinements which do not part from the true scope of the invention will be apparent to those skilled in the art. Accordingly, all such modifications and refinements are intended to be covered by the appended claims.

We claim:

1. In a photographic apparatus having a focusing lens movable along an axis for passing light from a far or near object toward stationary means adapted to align light sensitive media inside the appartus, means for automatically moving the lens toward said stationary means when said object is far, and away from said stationary means when said object is near, comprising:

emission means secured to said apparatus for transmitting a train of light signals toward said object at a constant angle relative to said axis;

movable first and second photoreceptors disposed in spaced relationship in said apparatus; each of said photoreceptors adapted to simultaneously receive at least a portion of said light signals upon reflection thereof from said object, said first and second photoreceptors simultaneously producing, respectively, first and second electrical signals corresponding to the portions of said light signals received;

signal translation means for receiving said electrical signals from said respective photoreceptors and producing a difference signal corresponding to the difference between said electrical signals; said difference signal having a first polarity when said first electrical signal is larger than said second electrical signal, and said difference signal having an opposite polarity when said second electrical signal is larger than said first electrical signal;

mechanical means, responsive to said difference signal for causing movement of said lens relative to said stationary means in one direction when said difference signal is of said first polarity, and in the opposite direction relative to said stationary means when said difference signal is of said opposite polarity; said mechanical means being further adapted to cause simultaneous movement of said photoreceptors until the portions of said light signals at said photoreceptors are equalized to produce an absolute minimal difference signal indicative of said object being properly focused on by said lens; and gain means, having a first position for maintaining the amplification of said difference signal, and a second position for raising the amplification of said difference signal; said gain means being set to said first position when said lens is moved past a predetermined point on said axis away from said stationary means, said gain means being set to said second position when said lens is moved past said predetermined point toward said stationary means, whereby the amplitude of said difference signal is automatically increased when focusing on far objects.

2. The photographic apparatus set forth in claim 1 further includes means coupled to said emission means for pulsing said light signals at a predetermined rate; and gating means, responsive to said pulsing means, for passing said difference signal from said signal translation means to said mechanical means at said predetermined rate.

3. The photographic apparatus set forth in claim 1 further includes means, coupled between said photoreceptors and said signal means, for blocking DC.

4. The photographic apparatus set forth in claim 1 further includes switch means for de-energizing said mechanical means when said difference signal exceeds a predetermined value of said first polarity or decreases below a predetermined value of said opposite polarity.

5. The photographic apparatus set forth in claim 1 wherein said constant angle is arranged to transmit said light signals parallel to said axis.

6. In a photographic apparatus having a focusing lens movable along an axis for passing light from a far or near object toward stationary means adapted to align light sensitive media inside the apparatus, means for automatically moving the lens toward said stationary means when said object is far, and away from said stationary means when said object is near, comprising:

emission means secured to said apparatus for transmitting a train of light signals toward said object at a constant angle relative to said axis;

movable first and second photoreceptors disposed in spaced relationship in said apparatus; each of said photoreceptors adapted to simultaneously receive at least a portion of said light signals upon reflection thereof from said object, said first and second photoreceptors simultaneously producing, respectively, first and second electrical signals corresponding to the portions of said light signals received;

signal translation means for receiving said electrical signals from said respective photoreceptors and producing a difference signal corresponding to the difference between said electrical signals; said difference signal having a first polarity when said first electrical signal is larger than said second electrical signal, and said difference signal having an opposite polarity when said second electrical signal is larger than said first electrical signal;

mechanical means, responsive to said difference signal for causing movement of said lens relative to said stationary means in one direction when said difference signal is of said first polarity, and in the opposite direction relative to said stationary means when said difference signal is of said opposite polarity; said mechanical means being further adapted to cause simultaneous movement of said photoreceptors until the portions of said light signals at said photoreceptors are equalized to produce an absolute minimal difference signal indicative of said object being properly focused on by said lens; and DC amplifier means, coupled to said mechanical means, adapted to amplify said difference signal upon receipt from said signal translation means; said DC amplifier means including bias means for producing a signal of said opposite polarity for energizing said mechanical means in the absence of said difference signal.

7. The photographic apparatus set forth in claim 6 further includes means for smoothing said difference signal prior to passage to said mechanical means.

* * * * *